(12) United States Patent
Schmidt et al.

(10) Patent No.: US 10,079,690 B2
(45) Date of Patent: Sep. 18, 2018

(54) METHOD FOR OPERATING ONE OR MORE SERVICE SYSTEMS

(71) Applicant: NEC Laboratories Europe GmbH, Heidelberg (DE)

(72) Inventors: Mischa Schmidt, Heidelberg (DE); Anett Schuelke, Gaiberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/743,308

(22) PCT Filed: Apr. 18, 2016

(86) PCT No.: PCT/EP2016/058489
§ 371 (c)(1),
(2) Date: Jan. 10, 2018

(87) PCT Pub. No.: WO2017/182047
PCT Pub. Date: Oct. 26, 2017

(65) Prior Publication Data
US 2018/0205571 A1    Jul. 19, 2018

(51) Int. Cl.
*H04L 12/28* (2006.01)
*G05B 15/02* (2006.01)
*G05B 19/05* (2006.01)

(52) U.S. Cl.
CPC .......... *H04L 12/2821* (2013.01); *G05B 15/02* (2013.01); *G05B 19/05* (2013.01); *H04L 12/2807* (2013.01); *G05B 2219/2642* (2013.01); *G05B 2219/32328* (2013.01)

(58) Field of Classification Search
CPC . H04L 12/2821; H04L 12/2807; G05B 15/02; G05B 19/05
See application file for complete search history.

(56) References Cited

U.S. PATENT DOCUMENTS 7,031,793 B1    4/2006   Jenkins et al.
8,615,312 B2   12/2013   Colombo et al.
2011/0035229 A1  2/2011   Colombo et al.
(Continued)

FOREIGN PATENT DOCUMENTS

EP       2408082 A1       1/2012
WO   WO 2011131753 A1   10/2011
WO   WO 2013171234 A1   11/2013
(Continued)

*Primary Examiner* — Curtis Odom
(74) *Attorney, Agent, or Firm* — Leydig, Voit & Mayer, Ltd.

(57) ABSTRACT

A method for operating one or more service systems includes receiving, by an input interface of the AE, one or more control requests for controlling one or more resources of one or more service systems, anticipating, by the AE, one or more future control requests (ACR), based on the one or more received control requests (RCR), prior stored control requests, and/or served control requests, and assessing, by the AE, an impact on the one or more service systems by checking an effect of selected control requests (CR), on resources of the one or more service systems, wherein the CR include at least one of the RCR, one or more already served control requests (SCR), and the ACR, when the CR would be performed on one or more of the resources of the at least one of the one or more service systems.

15 Claims, 5 Drawing Sheets

(56) References Cited

U.S. PATENT DOCUMENTS

2013/0041478 A1* 2/2013 Ploix .................. G05B 15/02
700/9
2013/0232267 A1 9/2013 Shatzkamer et al.

FOREIGN PATENT DOCUMENTS

| WO | WO 2014124353 A1 | 8/2014 |
| WO | WO 2015057689 A1 | 4/2015 |
| WO | WO 2017157465 A1 | 9/2017 |

* cited by examiner

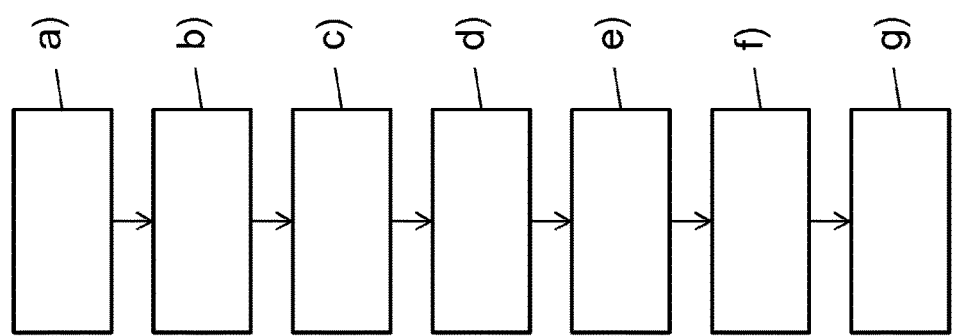

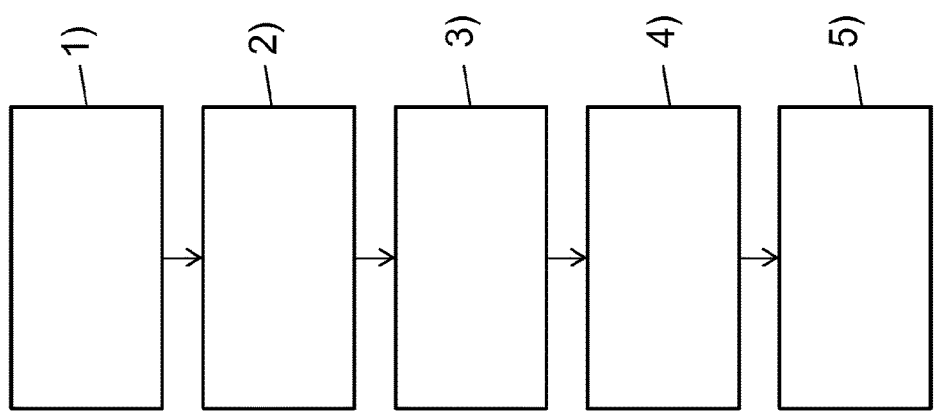

METHOD FOR OPERATING ONE OR MORE SERVICE SYSTEMS

CROSS REFERENCE TO RELATED APPLICATIONS

This application is a U.S. National Stage Application under 35 U.S.C. § 371 of International Application No. PCT/EP2016/058489 filed on Apr. 18, 2016. The International Application was published in English on Oct. 26, 2017 as WO 2017/182047 A1 under PCT Article 21(2).

INCORPORATION BY REFERENCE

International Patent Application No. PCT/EP2016/055997 is incorporated by reference herein.

FIELD

The present invention relates to a method for operating one or more service systems.

The present invention further relates to a computing entity, comprising an input interface for receiving one or more control requests for controlling one or more resources of one or more service systems, an output interface for transmitting adapted control requests to recipients of said control requests, and computation means comprising a processor and a memory.

The present invention further relates to a non-transitory computer readable medium storing a program causing a computer to execute a method for operating one or more service systems.

BACKGROUND

Conventional building management systems BMS, also referred to as building control or building automation systems—these terms are interchangeably used in this application—are modeled in a three layer architecture comprising
 a management layer as to which monitoring and control systems are associated
 an automation layer to which controllers, gateways or the like are associated and
 a field layer to which sensors, actuators or the like are associated.

The management layer enables human interaction and configuration in daily operation. This top layer communicates with automation level gateway devices e.g. via ModBus, M-Bus, EEB, BACnet/IP or OPC protocols to access information from sensing and actuation devices. Typically conventional management level systems are referred to as SCADA. SCADA-like systems are applicable to controlling various kinds of service provisioning systems. Such systems provide specific services to requestors, e.g. heating, ventilation, cooling, water, etc. and are denoted "service systems" in the following. Service systems may share resources, e.g. a gas boiler may provide thermal energy supply to heating systems and hot water systems inside a single building. Thus service systems may be inter-dependent. Service systems may also be inter-dependent due to other reasons, e.g. the physical layout of the building: a room cooled by air conditioning may share a wall with a room being heated. Service systems' behaviors are controlled by the BMS automation and field layers under guidance of the management layer.

BMS have usually a large amount of different sensors, actuators and controllers. Operators of a BMS try to enhance the efficiency of the service systems to save costs, etc.

The specific optimization of a single service system (e.g. a heating, ventilation and air-conditioning system HVAC) or e.g. a single area (e.g. floor or single office area) with respect to one or more defined key performance indicators KPI lacks the consideration of side effects on other systems or areas of the entire building and can have adverse impacts on total energy consumption or other applications' KPIs. In the EU FP-7 research projects CAMPUS21 and BaaS, the developed supervisory single system heating control optimizations are examples of specialized conventional applications using a networked BMS via a standardized request interface.

In a conventional SCADA setting, human staff's changes to the operational parameters of a single system, e.g. the HVAC supply temperatures, can have effects on other areas. The effects of changes are hard to predict even for expert users. For example a change to a system operation schedule or an adaptation of a supply temperature set-point curve can have significant effects on other systems by unforeseen interdependencies.

In conventional building management settings, SCADA systems have configured with permissible ranges of allowed control parameters and use credentials to protect against changes of configuration or control pattern. However these ranges are set statically and do not dependent on the operational context. Due to this, conventional systems are over-dimensioned subject to a so-called coincidence factor describing the probability of coinciding requests/demands. If operational reality deviates from this, resource shortages occur. The dimensioning of service systems due to coincidence factor is a trade-off: conservative estimates ensure operations but come at the cost of over dimensioned systems while optimistic estimates run the risk of frequent shortages and conflicts.

For instance an installed boiler capacity of a building is dimensioned by a peak load of different heat consuming systems (HVAC, space heating, hot water, potentially special systems like grass heating) expected to coinciding at most. As system configurations change, usage patterns and weather change, as well as refurbishment measures, e.g. replacement of boilers or heat exchangers over the lifetime of a building, situations can arise where the expected coincidence does not match reality anymore. Two negative scenarios can be conceived:
  1.) In case the heat supply capacity is insufficient, adverse effects or conflicts on all or only a subset of the systems are expected. Typically, these systems will react with increases in demand (e.g. by indicating increased system supply temperatures resulting in increased heat exchanger valve openings on the overall supply circuit) worsening the overall heating situation further.
  2.) In situations where the installed heat supply peak capacity is just sufficient, the boiler may run outside of maximum efficiency operation ranges.

In particular thermal systems such as space heating, hot water and cooling typically have much flexibility: e.g. indoor temperature controls usually aim at staying within a target temperature band (e.g. 20° C.±1° C.). Further by varying supply temperature set points they have flexibility in energy consumption and duration of operation.

In WO2013/171234 conflicts are detected and resolved by distributed orchestration engines hosted in e.g. PLC components. They detect that multiple conflicting requests have been received. The detected conflicts are communicated on a so-called service bus and are resolved by SCADA or Manufacturing Execution Systems (MES).

In U.S. Pat. No. 8,615,312 an orchestration engine is defined based on High Level Petri Nets (HLPN) defining the orchestration engine behavior to orchestrate service oriented service systems. No conflicts are resolved.

In US20110035229 also covers orchestration of services offered by service-oriented automation components of a manufacturing facility from one manufacturing level to a higher level such as the corporate, business and/or production level. No conflict resolution is described.

In US20130232267 resource requests in a communication network are resolved by applying policies to network flows based on the aggregated resource availability, e.g. using priorities and admitting or rejecting flows completely.

Further in U.S. Pat. No. 7,031,793 a method for conflict resolution is described among a plurality of controllers. By adapting the control instructions, e.g. based on mathematical models in a multi-tiered architecture conflicts are detected and resolved.

Even further in the non-patent literature of Ruta, M.; Scioscia, F.; Loseto, G.; Di Sciascio, E., "Semantic-Based Resource Discovery and Orchestration in Home and Building Automation: A Multi-Agent Approach," in Industrial Informatics, IEEE Transactions on, vol. 10, no. 1, pp. 730-741, February 2014 doi: 10.1109/TII.2013.2273433 a multi agent based conflict mediation and resource orchestration on the agent level for building domotics is described between a home agent and a device agent. Conflicts for newly received requests are negotiated on the agent level and based on utility expressions defined upon service preferences, i.e. if one agent's requests directly interfere with another agent's preferences.

In the non-published patent application PCT/EP 2016/055997 a retrospective resp. reactive solution resolving conflicts on shared resources and inter-dependencies for building automation is described. The described conventional method therein monitors control requests from so-called requestors towards the automation infrastructure and compares the already served requests in combination with a newly received request against rules defining adverse situations. In case one or more of the adverse situation rules (ASR) is violated, it is investigated if a reduction of one or more of the requests (already served and the newly received) could prevent ASR violation. If at least one combination of reductions can be constructed, these will be communicated for approval to the respective requestors. If agreed by the requestors, the modified requests are enacted.

SUMMARY

In an embodiment, the present invention provides a method for operating one or more service systems, the method being performed in a memory of an analyzing entity (AE). The method includes a) receiving, by an input interface of the AE, one or more control requests for controlling one or more resources of one or more service systems, b) anticipating, by the AE, one or more future control requests (ACR), based on the one or more received control requests (RCR), prior stored control requests, and/or served control requests, c) assessing, by the AE, an impact on the one or more service systems by checking an effect of selected control requests (CR) on resources of the one or more service systems, wherein the CR include at least one of the RCR, one or more already served control requests (SCR), and/or the ACR, when the CR would be performed on one or more of the resources of the at least one of the one or more service systems, d) checking, by the AE, if the assessed impact violates one or more adverse situation rules (ASR), an ASR violation representing a situation of one or more service systems in which at least partly contradicting effects on one or more of the resources of the one or more service systems would occur due to a serving of the one or more CR, e) upon violation of one or more ASR, computing, by the AE, one or more adapted control requests for one or more of the control requests and/or one or more of the already served control requests, the computing being directed to reduce violation of the ASR, f) negotiating, by the AE, the adapted control requests, with requestors of the one or more of the RCR, the SCR and/or of the one or more of the ACR, the negotiating may include one or more recomputed adapted control requests, until acceptance is achieved, and g) upon acceptance, transmitting by the AE, the adapted control requests via an output interface to recipients of the control requests.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows steps of a method according to a further embodiment of the present invention; and FIG. 5 shows steps of a method according to a further embodiment of the present invention.

DETAILED DESCRIPTION

Figure 1:
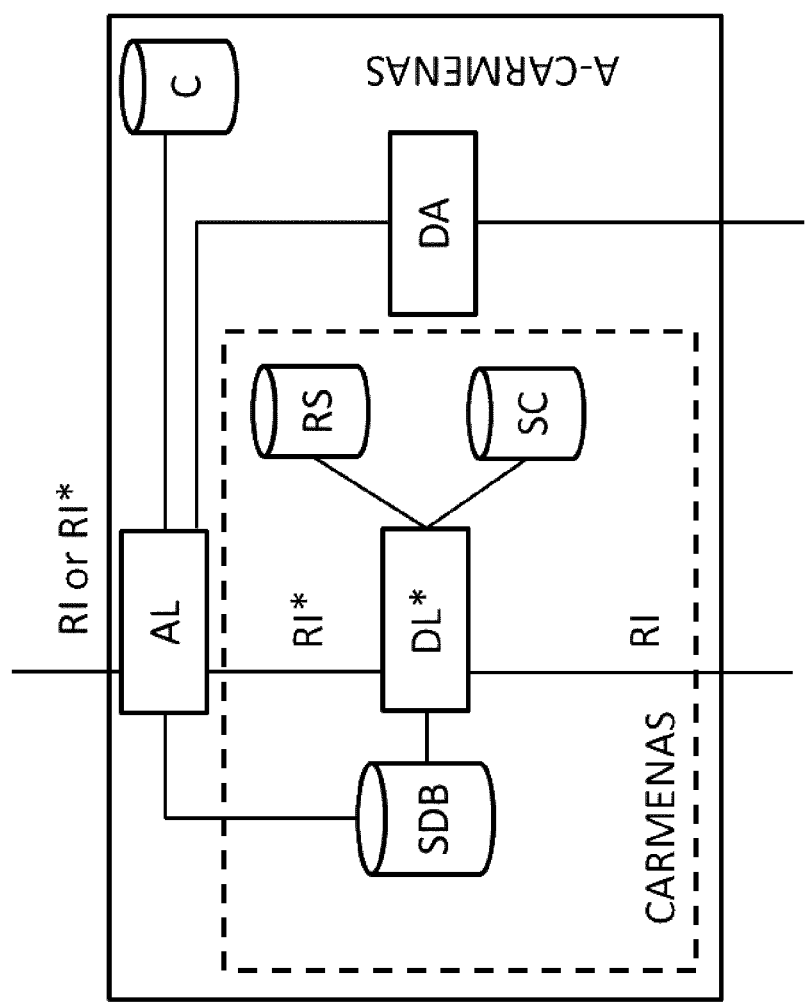
FIG. 1 shows a computing entity according to an embodiment of the present invention.

Although applicable to any kind of management system, the present invention will be described with regard to managing resources of building service systems controlled by building management systems (BMS).

Embodiments of the present invention increase the efficiency of service systems, in particular by providing enhanced adapted control requests.

Embodiments of the present invention avoid or at least reduce effects of colliding requests on system resources of a service system as well as interdependent service systems if present.

Embodiments of the present invention avoid misconfigurations, for example caused by human configuration errors of the service system.

In an embodiment, the present invention provides a method for operating one or more service systems, said method performed in a memory of an analyzing entity, 'AE', comprising the steps of:

a) receiving, by an input interface of said AE, one or more control requests for controlling one or more resources of one or more service systems, b) anticipating, by said AE, one or more future control requests, 'ACR', based on said received and/or prior stored and/or served control requests, c) assessing, by said AE, the impact on said one or more service systems by checking the effect of control requests, 'CR', on resources of said one or more service systems, said CR including least one of:
   said one or more received control requests, 'RCR',
   one or more already served control requests, 'SCR',
   one or more of said anticipated control requests,
   when said CR would be performed on one or more of the resources of said at least one of the said one or more service systems,
d) checking, by said AE, if said assessed impact violates one or more adverse situation rules, 'ASR', ASR violation representing a situation of one or more service systems in which at least partly contradicting effects on one or more of the resources of said one or more service systems would occur due to a serving of said one or more CR,
e) upon violation of one or more ASR, computing, by said AE, one or more adapted control requests for one or more of said control requests and/or one or more of said already served control requests, said computing being directed to reduce violation of said ASR,
f) negotiating, by said AE, said adapted control requests, with requestors of said one or more of said RCR, SCR and/or of said one or more of said ACR, said negotiating may include one or more recomputed adapted control requests, until acceptance is achieved,
g) upon acceptance, transmitting by said AE, the adapted control requests via an output interface to recipients of said control requests.

In a further embodiment, the present invention provides a computing entity, comprising an input interface for receiving one or more control requests for controlling one or more resources of one or more service systems, an output interface for transmitting adapted control requests to recipients of said control requests, computation means comprising a processor and a memory, being adapted receive, via said input interface one or more control requests for controlling one or more resources of one or more service systems, anticipate one or more future control requests, 'ACR' based on said received and/or prior stored and/or served control requests, to assess the impact on said one or more service systems by checking the effect of control requests, 'CR', for resources of said one or more service systems, said control requests including least one of: said one or more received control requests, 'RCR', one or more already served control requests, 'SCR', one or more anticipated control requests, when said CR would be performed on one or more of the resources of said at least one of the said one or more service systems, to check if said assessed impact violates one or more adverse situation rules, 'ASR', an ASR violation representing a situation of the one or more service systems in which at least partly contradicting effects on one or more of the resources of said one or more service systems would occur due to a serving of said of or more CR, upon violation of one or more ASR, computing one or more adapted control requests for one or more of said control requests and/or one or more of said already served control requests, said computing being directed to reduce violation of said ASR, negotiate said adapted control requests, with requestors of said one or more of said RCR, SCR and/or of said one or more of said ACR, said negotiating may include one or more recomputed adapted control requests, until acceptance is achieved, upon acceptance, transmitting the adapted control requests via an output interface to recipients of said control requests.

In a further embodiment the present invention provides a non-transitory computer readable medium storing a program causing a computer to execute a method for operating one or more service systems, said method comprising the steps of:
a) receiving one or more control requests for controlling one or more resources of one or more service systems,
b) anticipating one or more future control requests, 'ACR', based on said received and/or prior stored and/or served control requests,
c) assessing the impact on said one or more service systems by checking the effect of control requests, 'CR', on resources of said one or more service systems, said CR including least one of:
   said one or more received control requests, 'RCR',
   one or more already served control requests, 'SCR',
   one or more of said anticipated control requests,
   when said CR would be performed on one or more of the resources of said at least one of the said one or more service systems,
d) checking if said assessed impact violates one or more adverse situation rules, 'ASR', ASR violation representing a situation of one or more service systems in which at least partly contradicting effects on one or more of the resources of said one or more service systems would occur due to a serving of said one or more CR,
e) upon violation of one or more ASR, computing one or more adapted control requests for one or more of said control requests and/or one or more of said already served control requests, said computing being directed to reduce violation of said ASR,
f) negotiating said adapted control requests, with requestors of said one or more of said RCR, SCR and/or of said one or more of said ACR, said negotiating may include one or more recomputed adapted control requests, until acceptance is achieved,
g) upon acceptance, transmitting the adapted control requests via an output interface to recipients of said control requests.

The terms "computing entity", "analyzing entity" or the like are to be understood in their broadest sense and can refer in particular in the claims, preferably in the specification each to an entity adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The entities may each be adapted in such a way that the corresponding steps to be computed are performed in an optimized way. For instance different steps may be performed in parallel with a single processor on different of its cores. Further a plurality of same or different entities may be identical forming a single computing entity. The entity or entities may also be instantiated as a virtual entity running on a single or a plurality of physical computing resources. Different entities may therefore be executed on said physical computing resource.

The term "computer readable medium" can refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The terms "control request" or "request" can refer in particular in the claims, preferably in the specification, to data or information in form of one or more instructions e.g. provided in form of packets, messages, etc. indicating or initiating a request for changing, applying, operating, etc. changes on operating or performing resources. For instance set-points of one or more service systems are initiated to be changed by a control request.

The term "negotiating" can refer in particular in the claims, preferably in the specification for example to at least one "round" of steps:
  proposing an amendment of a control request,
  evaluating the proposed amended control request,
  feedback of the evaluated control request, and
  proposing a further amendment of the amended control request if applicable or accept the proposed amended control request.
Then e.g. re-amend the amended control request or accept the proposed amended request, etc. can be performed. Further the term "negotiating" refers preferably in the claims, in particular in the specification to collaboratively agree on a control request or an amended control request.

The term "contextual information" can refer preferably in the claims, in particular in the specification to information which may be relevant and/or may be have an impact and/or may be helpful, etc. for operating said service system. Contextual information may be for example day of the week, weather parameters or information queried from service systems, sensors, actuators, etc.

The term "temporal information" can refer preferably in the claims, in particular in the specification to information which may be relevant and/or may be have an impact and/or may be helpful, etc. for sequentially and/or in parallel operating one or more service systems with one or more control requests, instructions or the like.

The term "relationship" in connection with "contextual information" or "temporal information" can refer in particular in the claims, preferably in the specification to information defining, representing, showing, describing and/or relating intra-dependencies between resources of a service system and/or inter-dependencies between resources of different service systems. These inter- or intra-dependencies may be directly implemented or indirectly apparent, e.g. when certain control requests are served, e.g. by studying behaviors of said service systems.

The term "anticipating" in connection with "control request" can mean in particular in the claims, preferably in the specification, a computation of possible or potential future control requests in certain situations of said one or more service systems.

For assessing the impact on said one or more service systems according to step c), operational parameters representing behavior of said one or more service systems may be evaluated and/or contextual information and/or temporal information may be computed and evaluated including computing service system relationships. This enables a high precision when assessing the impact of control requests on said service system or service systems.

An indicator may be added to said ACR for identification of ACR. This enables in an easy way to distinguish received control requests from anticipated control requests or already served control requests.

ACR may be generated for a finite time horizon. This enables in an flexible and easy way to specify for which or until which future time point control requests are anticipated.

Temporal relationship information and/or contextual relationship information may be computed using machine learning procedures and/or probabilistic models like Bayesian networks or the like and used for anticipating ACR. This enables in a flexible way to provide with ongoing time more precise anticipated control requests based on continuously enhanced temporal relationship information and/or contextual relationship information.

ACR may be associated with a level of prediction confidence and computed ACR may be only used for step c) when a certain confidence level threshold is exceeded. This avoids the need to consider ACR with a low confidence level. Thus, efficiency is enhanced.

A plurality of ACR may be computed with different underlying settings of operational parameters and only those exceeding a certain confidence level threshold are used for step c). This further increases the efficiency since on the one hand only anticipated control requests ACR which provide a certain confidence level are used for assessing the impact on said one or more service systems and on the other hand a plurality of different ACR is provided enabling an efficient negotiation.

Only a certain number of ACR exceeding said prediction confidence level threshold may be used for step c). This allows to limit the number of ACR used for step c). Thus, an efficient assessing according to step c) is enabled. Further only those ACR with the highest associated confidence may be used in step c).

Upon receiving a CR for a resource within said finite time horizon for which earlier a CR has been predicted, a likelihood of anticipating a control request associated to said earlier request may be increased correspondingly and/or upon not receiving a CR for a resource within said finite time horizon for which earlier a CR has been predicted, a likelihood of anticipating a control request associated to said earlier request may be decreased correspondingly. This further enhances the computation of anticipated control requests since the likelihood of a control request being anticipated having a low likelihood is reduced, whereas the control request, for which an earlier control request is predicted is increased. Thus, efficiency and precision of anticipated control request is enhanced.

Said ACR are only provided upon request. This allows for example that anticipated control requests are only computed when needed. Thus, computational resources are saved.

The delay of ACR within said finite time horizon may be predicted, wherein information of said delay may be included in said negotiation according to step f) and/or may be included in ACR. This information enables when included into the negotiation or added or included in an ACR a better planning for requestors.

In case an ACR being used during negotiation was not received within said finite time horizon a new negotiation according to step f) may be triggered to be performed without said ACR or an information said ACR was not received is provided. This further enhances the precision of anticipating control requests and even further efficiency is enhanced.

Interdependencies between resources may be exploited to prevent computation of future control requests, said prevention may be provided in form of an anticipated control request causing an ASR violation. This enables to actively prevent a future control request. For example an ACR is issued causing an ASR violation and in a following negotiation said ACR may behave in such a way that the other service systems will behave so that at the end the ACR will not come in the future. In this case the ACR is prevented, i.e. not received, within said finite time horizon. Thus, no indication or negotiation is triggered. Said behavior is also described below at the end of the description of FIG. 1.

FIG. 1 shows a computing entity according to an embodiment of the present invention. In FIG. 1 an anticipatory extension of the CARMENAS system as disclosed in PCT/EP 2016/055997 is shown. In the embodiment of FIG. 1, in the following called "A-CARMENAS" said system is configured with information of which service systems are inter-dependent, e.g. due to spatial relationships or linked by a shared resource or supply system. This information can be configured by a human expert, inferred by machine learning techniques from building data, or deduced from information stored in a so-called Building Information Model. A-CARMENAS is assumed to have access to building operational data and context information such as scheduled occupation, weather and weather forecast. A-CARMENAS may also have access to historic building operational data and historic context information.

The CARMENAS structure comprises a State Data Base SDB, a Decision Logic DL, a Rule Storage RS and a System Characteristic Data Base SC. It receives requests via a Request Interface RI or RI*, starts negotiations for request adaptation with applications via RI* and interacts with the Management Layer or the Automation Layer via RI.

The embodiment of FIG. 1 further comprises a component of Anticipatory Logic AL, a Data Base of learned Request Characteristics C and a Data Acquisition component DA. Further the Decision Logic DL is modified from DL to DL* to be able to handle an indicator identifying anticipated requests ACR created in anticipation of future requests to come.

These components may be separate entities or some or all components may be implemented on a common entity, e.g. called analyzing entity. For instance, the analyzing entity may comprise some or all components of the A-CARMENAS system.

The AL monitors incoming requests on the request interface RI or RI* and accesses via the DA context information and operational data. Examples of such context data may be building operational data, schedule information, weather data and weather forecast information, presence sensors, etc. Further it accesses the state database SDB for information about currently active requests. The AL may be configured with a finite time horizon H within which requests are anticipated. The learning of temporal relationships of requests and/or context information to inter-dependent systems can use conventional learning or probabilistic models. In general, conventional methods that predict the posterior probability of an anticipated request event given the current state of the building and context information both via DA and the received request via RI* and the served requests via SDB may be applicable. For example Bayesian Networks may be used in this kind of applications to predict the probability of anticipated events.

Taking into account the temporal and contextual relationships of requests stored in C, the AL creates anticipated requests ACR in anticipation of requests to come for each building system within the time horizon H. The embodiment of FIG. 1 then issues these towards the modified DL*. The ACRs are marked with an indicator flag such that DL* can incorporate ACRs in its ASR checks and negotiations, but will not enact ACRs or modified ACRs after negotiation towards the automation system.

The AL may use conventional predictive models that can associate levels of confidence for its predictions. The AL issues ACRs only if a configured confidence threshold T of a predictive model is exceeded. In another embodiment, the AL may create multiple ACRs of different set point values and selects among these per system the ACRs with maximum associated confidence provided this exceeds the confidence threshold.

The CARMENAS DL* component of A-CARMENAS will check rules and, if rules are violated, will trigger negotiations via RI* towards the AL. In case AL is connected via RI* supporting negotiation towards applications, it will pass on the negotiation requests except for the artificially created requests.

In another embodiment, AL will not compromise on negotiation requests from DL* associated to ACRs. In an even further embodiment the AL will compromise on negotiation requests from DL* associated to ACR.

In an embodiment, AL updates the learning information C: If within H, a request is received for a system for which earlier an ACR was predicted, AL will update its learning information in C—in case the request parameters deviate from ACR. ACR will be forwarded towards DL and possibly inject a also a related new ACR is injected.

If within H no request is received for a system for which earlier an ACR was predicted, AL will update its learning information in C—to reduce the likelihood of anticipating a request associated to the earlier request and context information.

In a further embodiment of FIG. 1 said embodiment is not only triggered by requests on the RI or RI* interface, but regularly checks the status of context and operational building data. In this case, the AL uses its predictive capabilities to anticipate future requests and issue, if appropriate (i.e. with high confidence), an artificial request.

In another embodiment, the AL does not inject ACRs into the DL*, but provides ARs upon query by DL*.

In a further embodiment, the AL predicts also how much delay the ACR is expected to come within H. This information may then be included in negotiation information to the requestors for their better planning.

In a further embodiment, the AL provides within the ACR to the DL an indication with how much delay the ACR is expected to come within H.

In the embodiment, where the AL provides within the ACR to the DL* an indication with how much delay the ACR is expected to come within H and in case the CARMENAS SC storage is configured with the energetic profiles of the building systems, the DL* calculates when and by how much the supply shortage will be created in case the ACR is received as predicted. Then, DL*

1. calculates by how much the supply will be insufficient when the ACR is to be received (this is denoted Excess Demand (ED));
2. calculates how much spare capacity (SPC) is available without the ACR;
3. distributes ED (up to the maximum available supply, i.e. ED-SPC is actually distributed) in the time span from the received request until the ACR is expected among the different systems, using the stored system characteristics relating to the received request and the already served requests. This may be done by calculating modifications to the requests based on the stored energetic system characteristics so that ED is maximally covered in the time until ACR without exceeding SPC. These modifications are negotiated, e.g. in conventional CARMENAS fashion to the requestors.

In a further embodiment also a planned reduction is communicated to the requestors by calculating a proposed distribution of the ED among the already served requests.

In a further embodiment, the energy planning information is included to the requestors via RI*: until when (i.e. the predicted delay when the anticipated request will be actually received within H) is communicated together with the request for the improvement. In a further embodiment, also the calculated distribution of the ED among the already served requests expected after this delay (i.e. when the anticipated request is actually received) is also indicated to the requestors in the negotiation.

In case the anticipated request ACR for which the ACR was injected was not received within H, i.e. in case A-CARMENAS erred in its anticipation, the AL triggers a negotiation with all requestors that were involved in the negotiation to accommodate the ACR with their original requests (received request or already served requests). For this, the AL stores the ACR as well as the original requests when issuing the ACR, in order to suggest a modification back to the original values in the CARMENAS negotiation. In response, the requestors may or may not agree to the suggested modification, depending on their individual control strategies.

In another embodiment, the AL does not start a negotiation with the requestors suggesting a modification back to the originally requested values, but sends an indication message (novel for RI) to all affected requestors that the ACR was not received and the anticipated conflict did not occur. In response, the requestors may or may not trigger a new request.

In a further embodiment the AL may be configured such that it exploits system interdependencies actively to prevent future requests. It will then issue an ACR causing an ASR violation and in the negotiation behave in such a way that the other systems will behave so that the anticipated request will not come in future. In this case, of course the anticipated request is prevented, i.e. not received within H. As this was intended, the Erred Anticipation behavior as mentioned above is not executed, i.e. no indication or negotiation is triggered. Also the information in C may not need to be updated.

An example of this kind of use of A-CARMENAS would be the anticipation of heating request when a high cooling request for the same building area is received. By anticipating the heating request, ASRs are violated in the DL, and negotiation will reduce the cooling request. This way the heating request may be avoided altogether.

Figure 2:
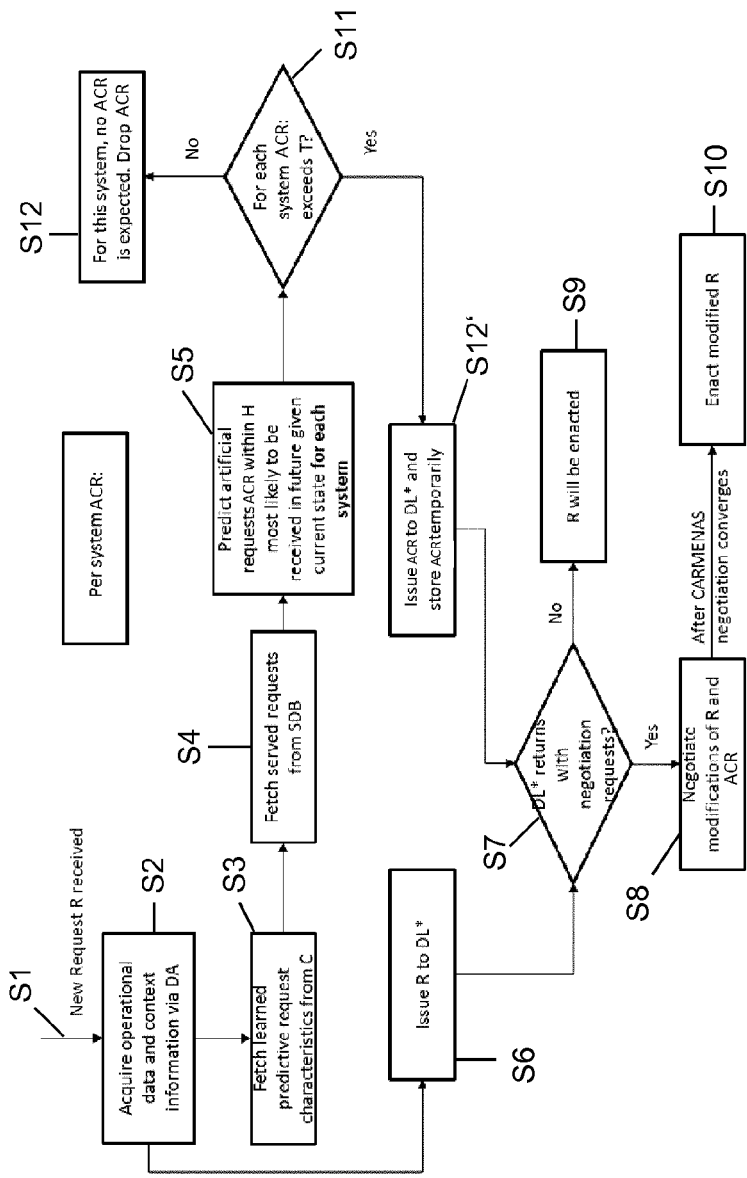
FIG. 2 shows steps of a method according to a further embodiment of the present invention.

FIG. 2 shows steps of a method according to a further embodiment of the present invention. In FIG. 2 a flow diagram of a method according to an embodiment of FIG. 1 is shown. Upon receiving a new request R in a first step S1, the data acquisition entity DA acquires operational data and context information in a second step S2. In a third step S3 learned predictive request characteristics are fetched from the data base of learned request characteristics C. In a fourth step S4 served requests from the state data base SDB are fetched. In a fifth step S5 artificial requests ACR are predicted within the finite time horizon H most likely to be received in future given the current state for each service system. Then in an eleventh step S11 it is checked whether for each system anticipated control request ACR the threshold for likelihood T is exceeded. If not then in a twelfth step S12 for this service system no anticipated control request ACR is expected and said anticipated control request ACR is dropped. If yes then in another twelfth step S12' the anticipated control request ACR is issued the decision logic DL* and said ACR is temporarily stored. Further after the second step S2 said new request R is issued to the decision logic DL* in a sixth step S6. From the sixth step S6 and/or from the twelfth step S12 it is checked in a seventh step S7 if the decision logic DL* returns with negotiation requests. If yes then in an eighth step S8 modifications of said new request R and the anticipated control requests ACR are negotiated and then after when negotiation converges in a tenth step S10 the modified request R is enacted. If not then in a ninth step S9 the original request R will be enacted.

Figure 3:
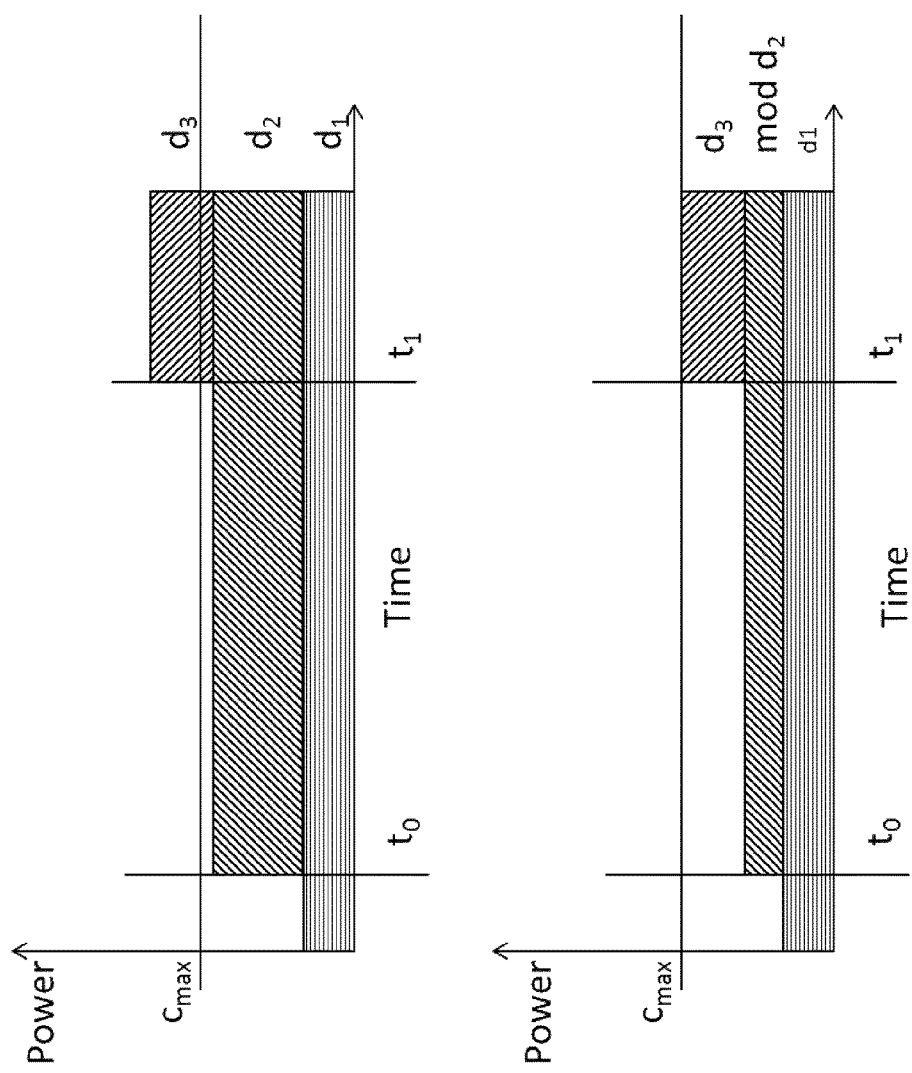
FIG. 3 shows part of a conflict resolution according to a further embodiment of the present invention.

FIG. 3 shows part of a conflict resolution according to a further embodiment of the present invention. In FIG. 3 an anticipatory conflict solution at time $t_0$ is shown. Conflict occurs due to the anticipated request ACR of system 3 shown in the upper half of FIG. 3 and resolved conflict after adapting system 2 with negotiation shown in the lower part of FIG. 3.

In detail FIG. 3 provides an example to illustrate the concept of anticipatory conflict resolution. In detail the upper part of FIG. 3 describes the following: At time $t_0$ a request for consuming thermal energy from a shared heating supply system is received for system 2 (water heating). From the stored system characteristics, A-CARMENAS deduces a power demand of $d_2$. There is already system 1 (static heating baseload) being served with demand $d_1$. A-CARMENAS anticipates that at time $t_1$ within the prediction horizon H, it will be highly probable to receive a request for the HVAC (system 3) to provide additional space heating with a demand $d_3$. The sum of the requests would exceed the configured maximum thermal supply capacity $c_{max}$. Therefore a negotiation with suggestions to adapt the system requests will be started with the requestors for systems 1 and 2. In this example, the AL is configured to not agree any negotiations for system 3.

In detail the lower part of FIG. 3 describes the following: During negotiation, system 1 did not agree to modifications for the base load due to the requestor's internal policy. After contacting the requestor responsible for system 2, another heating curve is selected for the hot water heating and resulting in a modified energy demand mod $d_2$ sufficient to accommodate the anticipated request for system 3. In case the actually received request for demand of system 3 will be higher, another conflict situation will arise (to be detected and resolved by CARMENAS functionality). In case within H no request for system 3 will be received, A-CARMENAS will contact system 2 to indicate that a reverting back to the original system 2 request would be possible if desired. Of course, A-CARMENAS could have also suggested to system 2 to increase its demand between $t_0$ until $t_1$ to move a part of its demand upfront.

FIG. 4 shows steps of a method according to a further embodiment of the present invention. In FIG. 4 a method for operating one or more service systems is shown, said method performed in a memory of an analyzing entity, 'AE', comprising the steps of:
  a) receiving, by an input interface of said AE, one or more control requests for controlling one or more resources of one or more service systems,
  b) anticipating, by said AE, one or more future control requests, 'ACR', based on said received and/or prior stored and/or served control requests,
  c) assessing, by said AE, the impact on said one or more service systems by checking the effect of control requests, 'CR', on resources of said one or more service systems, said CR including least one of:
said one or more received control requests, 'RCR',
one or more already served control requests, 'SCR',
one or more of said anticipated control requests,
when said CR would be performed on one or more of the resources of said at least one of the said one or more service systems,
d) checking, by said AE, if said assessed impact violates one or more adverse situation rules, 'ASR', ASR violation representing a situation of one or more service systems in which at least partly contradicting effects on one or more of the resources of said one or more service systems would occur due to a serving of said one or more CR,
e) upon violation of one or more ASR, computing, by said AE, one or more adapted control requests for one or more of said control requests and/or one or more of said already served control requests, said computing being directed to reduce violation of said ASR,
f) negotiating, by said AE, said adapted control requests, with requestors of said one or more of said RCR, SCR and/or of said one or more of said ACR, said negotiating may include one or more recomputed adapted control requests, until acceptance is achieved,
g) upon acceptance, transmitting by said AE, the adapted control requests via an output interface to recipients of said control requests.

FIG. 5 shows steps of a method according to a further embodiment of the present invention. In FIG. 5 a method for mediating control requests in buildings is shown, comprising the steps of:
1) Receiving control requests,
2) Anticipating future control requests,
3) System specific assessment of control request impact in operational context considering requests already served, current request and anticipated requests,
4) Adversary Situation Rule checking and derivation of possible request modifications in case of ASR violations by CARMENAS,
5) Negotiation of request modifications with requestors for active and newly received request.

In summary the present invention enables or provides:
1) Contextual detection of conflicts created by control requests for different service systems, e.g. via shared supply systems or shared bottlenecks in anticipation of future requests within a configurable time horizon typically received in similar situations
2) Anticipatory context aware request conflict resolution
3) Negotiation of adaptation of control requests to resolve the conflict with requestors to accommodate anticipated requests by other requestors.

At least one embodiment may have at least one of the following advantages:
Protection against unintended adverse service system interactions by individual application control requests in anticipation of future control requests.
Negotiation/modification of requests allows specialist applications to become reactive to building/service system context and accommodate future building requests in an anticipatory fashion.
Detection of possibly adverse situations allows to diagnose applications and system configurations considering requests also anticipatorily.
A-CARMENAS allows choosing the coincidence factor even more optimistically than CARMENAS.

The present invention can be applied to SCADA protection, i.e. product on top of Management Layer, SCADA Corrector between Management and Automation Layers or can be used for anticipatory request checking, request modification and negotiation as function to SCADA/BMS vendors.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention is:
1. A method for operating one or more service systems, the method being performed in a memory of an analyzing entity (AE), the method comprising:
a) receiving, by an input interface of the AE, one or more control requests for controlling one or more resources of one or more service systems;
b) anticipating, by the AE, one or more future control requests (ACR), based on the one or more received control requests (RCR), prior stored control requests, and/or served control requests;
c) assessing, by the AE, an impact on the one or more service systems by checking an effect of selected control requests (CR) on resources of the one or more service systems, wherein the CR include at least one of the RCR, one or more already served control requests (SCR), and/or the ACR when the CR would be performed on one or more of the resources of the at least one of the one or more service systems;
d) checking, by the AE, if the assessed impact violates one or more adverse situation rules (ASR), an ASR violation representing a situation of one or more service systems in which at least partly contradicting effects on one or more of the resources of the one or more service systems would occur due to a serving of the one or more CR;
e) upon violation of one or more ASR, computing, by the AE, one or more adapted control requests for one or more of the control requests and/or one or more of the already served control requests, the computing being directed to reduce violation of the ASR;
f) negotiating, by the AE, the adapted control requests, with requestors of the one or more of the RCR, the SCR and/or of the one or more of the ACR, the negotiating may include one or more recomputed adapted control requests, until acceptance is achieved; and g) upon acceptance, transmitting by the AE, the adapted control requests via an output interface to recipients of the control requests.

2. The method according to claim 1, wherein for assessing the impact on the one or more service systems according to c). operational parameters representing behavior of the one or more service systems are evaluated and/or contextual information and/or temporal information including computing service system relationships are computed and evaluated.

3. The method according to claim 1, wherein an indicator is added to the ACR for identification of the ACR.

4. The method according to claim 1, wherein the ACR are generated for a finite time horizon.

5. The method according to claim 1, wherein temporal relationship information and/or contextual relationship information is computed using machine learning procedures and/or probabilistic models like Bayesian networks or the like and used for anticipating the ACR.

6. The method according to claim 1, wherein the ACR are associated with a level of prediction confidence and computed ACR are only used for c) when a certain confidence level threshold is exceeded.

7. The method according to claim 1, wherein a plurality of the ACR are computed with different underlying settings of operational parameters and only those exceeding a certain confidence level threshold are used for c).

8. The method according to claim 6, wherein only a certain number of the ACR exceeding the prediction confidence level threshold are used for c).

9. The method according to claim 4, wherein upon receiving a selected CR for a resource within the finite time horizon for which earlier a selected CR has been predicted, a likelihood of anticipating a control request associated to the earlier request may be increased correspondingly and/or upon not receiving a CR for a resource within the finite time horizon for which earlier a selected CR has been predicted, a likelihood of anticipating a control request associated to the earlier request may be decreased correspondingly.

10. The method according to claim 1, wherein the ACR are only provided upon query.

11. The method according to claim 4, wherein the delay of ACR within the finite time horizon is predicted, wherein information of the delay may be included in the negotiation according to f) and/or may be included in ACR.

12. The method according to claim 4, wherein in case a first ACR being used during negotiation was not received within the finite time horizon a new negotiation according to f) is triggered to be performed without the first ACR or an information the ACR request was not received is provided.

13. The method according to claim 1, wherein interdependencies between resources are exploited to prevent computation of future control requests, wherein the prevention is provided in form of an ACR causing an ASR violation.

14. A computing entity, comprising an input interface for receiving one or more control requests for controlling one or more resources of one or more service systems;

an output interface for transmitting adapted control requests to recipients of the one or more control requests, a computer comprising a processor and a memory, being adapted to:

receive, via the input interface, the one or more control requests for controlling one or more resources of one or more service systems, anticipate one or more future control requests (ACR) based on the one or more received control requests (RCR), one or more prior stored control requests, and/or one or more served control requests, assess the impact on the one or more service systems by checking an effect of selected control requests (CR) for resources of the one or more service systems, the CR including least one of the RCR, one or more already served control requests (SCR), and/or the ACR wherein the CR would be performed on one or more of the resources of the at least one of the one or more service systems, check if the assessed impact violates one or more adverse situation rules (ASR), wherein an ASR violation represents a situation of the one or more service systems in which at least partly contradicting effects on one or more of the resources of the one or more service systems would occur due to a serving of one or more CR, upon violation of one or more ASR, compute one or more adapted control requests for one or more of the control requests and/or one or more of the SCR the computing being directed to reduce violation of the ASR, negotiate the adapted control requests, with requestors of the one or more of the RCR, SCR and/or of the one or more of the ACR, wherein the negotiating includes one or more recomputed adapted control requests, until acceptance is achieved, and upon acceptance, transmit the adapted control requests via an output interface to recipients of said control requests.

15. A non-transitory computer readable medium storing a program causing a computer to execute a method for operating one or more service systems, the method comprising:

a) receiving one or more control requests for controlling one or more resources of one or more service systems, b) anticipating one or more future control requests (ACR), based on the one or more received control requests (RCR), prior stored control requests, and/or served control requests, c) assessing the impact on the one or more service systems by checking an effect of selected control requests (CR) on resources of the one or more service systems, wherein the CR include at least one of the RCR, one or more already served control requests (SCR), and/or the ACR when the CR would be performed on one or more of the resources of the at least one of the one or more service systems, d) checking if the assessed impact violates one or more adverse situation rules (ASR), an ASR violation representing a situation of one or more service systems in which at least partly contradicting effects on one or more of the resources of said one or more service systems would occur due to a serving of the one or more CR, e) upon violation of the ASR, computing one or more adapted control requests for one or more of the control requests and/or one or more of the already served control requests, the computing being directed to reduce violation of the ASR.

f) negotiating the adapted control requests, with requestors of the one or more of the RCR, the SCR, and/or of the one or more of the ACR, the negotiating including one or more recomputed adapted control requests, until acceptance is achieved, and g) upon acceptance, transmitting the adapted control requests via an output interface to recipients of the control requests.

\* \* \* \* \*